US011955759B2

(12) United States Patent
Nickerson et al.

(10) Patent No.: US 11,955,759 B2
(45) Date of Patent: Apr. 9, 2024

(54) IRRIGATION CONTROLLER WITH VERTICALLY OFFSET TERMINAL CONNECTORS ROWS

(71) Applicant: Rain Bird Corporation, Azusa, CA (US)

(72) Inventors: Harvey J. Nickerson, El Cajon, CA (US); Kenneth R. Venegas, San Jose, CA (US); Michael D. Goslee, Tucson, AZ (US); Young Suk Kim, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 283 days.

(21) Appl. No.: 17/572,304

(22) Filed: Jan. 10, 2022

(65) Prior Publication Data

US 2022/0224027 A1 Jul. 14, 2022

Related U.S. Application Data

(60) Provisional application No. 63/137,025, filed on Jan. 13, 2021.

(51) Int. Cl.
| | |
|---|---|
| *H01R 9/24* | (2006.01) |
| *A01G 25/16* | (2006.01) |
| *H01R 4/34* | (2006.01) |
| *H01R 13/639* | (2006.01) |

(52) U.S. Cl.
CPC ........... *H01R 9/2416* (2013.01); *A01G 25/16* (2013.01); *H01R 4/34* (2013.01); *H01R 13/639* (2013.01)

(58) Field of Classification Search
CPC ......... H01R 9/2416; H01R 4/34; A01G 25/16
USPC ........................................ 439/709
See application file for complete search history.

(56) References Cited

U.S. PATENT DOCUMENTS

| | | | | |
|---|---|---|---|---|
| 2,787,773 | A | * | 4/1957 | Potter .................... H01R 9/24 439/715 |
| 2,991,440 | A | * | 7/1961 | Kulka .................... H01R 12/58 174/267 |
| 3,930,706 | A | | 1/1976 | Obuch |
| 4,082,407 | A | | 4/1978 | Smorzaniuk |

(Continued)

OTHER PUBLICATIONS

USPTO; U.S. Appl. No. 16/944,909; Non-Final Rejection dated Mar. 30, 2022; (11 pages).

*Primary Examiner* — Neil Abrams
(74) *Attorney, Agent, or Firm* — Fitch, Even, Tabin & Flannery, LLP

(57) ABSTRACT

An irrigation control device is provided that includes adjacent terminal connector rows having a ridge portion between the rows, where the ridge portion is configured to support and guide wires to the terminal connectors of one row, and to support these wires above wires retained in another row of terminal connectors. In some embodiments, one of the terminal connector rows includes a plurality of risers coupled to the terminal connectors positioned in that row. The risers provide a vertical offset between the adjacent terminal connector rows, as well as a secure electrical and mechanical connection point for the wires to connect to the circuit board directly, or alternatively to the corresponding electrical pads coupled to the circuit board. The housing may include divider walls that each provide an additional barrier or isolation between side-by-side electrical connection pads, terminal connectors and their associated wires.

20 Claims, 12 Drawing Sheets

(56) References Cited

U.S. PATENT DOCUMENTS

| | | | | |
|---|---|---|---|---|
| 4,872,855 A | * | 10/1989 | Norden | H01R 9/2408 |
| | | | | 439/713 |
| 5,427,550 A | * | 6/1995 | Jaag | H01R 12/515 |
| | | | | 439/727 |
| 5,853,302 A | * | 12/1998 | Roman | H01R 12/721 |
| | | | | 439/709 |
| 6,842,667 B2 | | 1/2005 | Beutler | |
| 7,347,739 B2 | * | 3/2008 | Cox | H01R 4/38 |
| | | | | 439/709 |
| 7,574,285 B2 | | 8/2009 | Kah | |
| 7,613,546 B2 | | 11/2009 | Nelson | |
| 7,640,079 B2 | | 12/2009 | Nickerson | |
| 7,909,633 B1 | * | 3/2011 | Miller | H01R 4/305 |
| | | | | 439/441 |
| 8,113,864 B2 | * | 2/2012 | Chiang | H01R 13/4361 |
| | | | | 439/709 |
| 8,977,400 B1 | | 3/2015 | Porter | |
| 11,552,417 B2 | * | 1/2023 | Walker | A01G 25/16 |
| 2008/0058964 A1 | | 3/2008 | Nickerson | |
| 2010/0081341 A1 | * | 4/2010 | Wu | H05K 1/182 |
| | | | | 439/709 |
| 2014/0018965 A1 | | 1/2014 | Pearson | |
| 2021/0036447 A1 | | 2/2021 | Walker | |
| 2021/0287839 A1 | | 9/2021 | Lee | |
| 2022/0224027 A1 | * | 7/2022 | Nickerson | H01R 9/2416 |

\* cited by examiner

IRRIGATION CONTROLLER WITH VERTICALLY OFFSET TERMINAL CONNECTORS ROWS

CROSS-REFERENCE TO RELATED APPLICATION

This application claims the benefit of U.S. Provisional Application No. 63/137,025, filed Jan. 13, 2021, which is incorporated herein by reference in its entirety.

TECHNICAL FIELD

This invention relates generally to irrigation controllers and specifically relates to irrigation controllers having a terminal connector block for connecting wiring from the controller to irrigation station valves.

BACKGROUND

Terminal connector blocks for irrigation controllers are typically arranged in horizontal rows for an installer to access. Terminal connections are locations on the controller to which wires are connected to the controller. The wires can connect sensors to the controller at input terminals or may connect devices controlled by the controller at output terminals. Output terminals are typically connected to electrically actuated valves. For example, the controller switches an output AC signal to an output terminal, and a wire coupled to the output terminal carries the AC signal to a solenoid that opens a valve allowing pressurized water to flow therethrough to one or more sprinklers. In a traditional controller, there are a variety of separate terminals including AC voltage signal input terminals, sensor input terminals, accessory connection terminals, a common line output terminal, a master valve output terminal and multiple station output terminals. An irrigation controller controlling eight stations will need eight separate output connection terminals and a common terminal, whereas a controller controlling twelve stations will need twelve separate output connection terminals and the common terminal. Increasing the number of stations controlled increased the number of terminals needed, and thus, the space needed for the connector block (also referred to as a connector strip). Many irrigation controllers are small and have limited space for a large number of output terminals. Moreover, physically and electrically isolating terminal connectors and their associated wires within limited space becomes increasingly difficult.

BRIEF DESCRIPTION OF THE DRAWINGS

Disclosed herein are embodiments of systems, apparatuses and methods pertaining to controlling irrigation. This description includes drawings, wherein.

Figure 1:
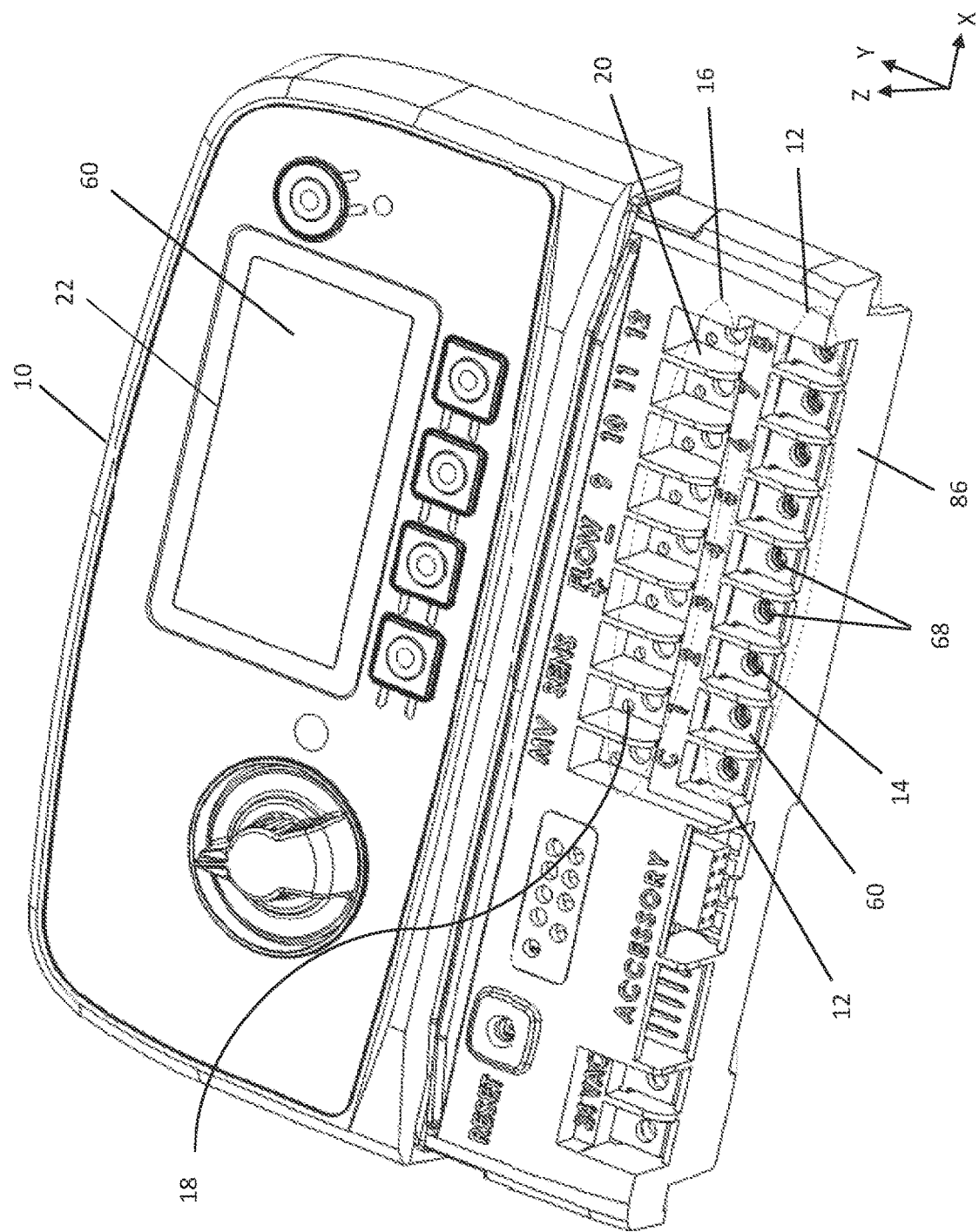
FIG. 1 is a perspective view of an irrigation controller with terminal connector rows in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, devices and methods are provided herein useful in providing and arranging terminal connector blocks in irrigation controllers. Also included herein are systems, devices and methods that are useful for electrically and physically isolating terminal connectors using vertical offsets and horizontal offsets between adjacent terminal connector blocks. Specifically, terminal connectors in one terminal connector row area are coupled to vertical lifts or risers that elevate that row of terminal connectors in a horizontal plane above another row of terminal connectors. In addition, in some embodiments the housing includes a ridge portion, that abuts or is located adjacent to the risers, providing additional physical and electrical separation of the rows of wires connected to each of the terminal connector rows.

Throughout the figures and description, several views are shown of an irrigation controller, and/or portions or components thereof that provide an arrangement of terminal connector rows in accordance with some embodiments. An irrigation controller typically includes a housing, a user interface (e.g., display screen, buttons, dials, lights, etc.), a control circuit and memory for controlling operation of the controller and executing watering schedules, electrical connections for input power (or alternatively, a battery for power), other electrical components and switches (e.g., relays or triacs), various input connectors for sensors, accessories, etc., and output connectors such as a station output connection terminals, common line and master valve output terminal connections. The irrigation controller also includes a circuit board having electrical connections, conduits, and traces between connection locations of the circuit board. The circuit board will have electrical devices mounted thereto including a control circuit (not shown). The electrical devices may include, for example, a microprocessor, integrated circuit devices, one or more memories, switches, power components, surge components, etc.

The embodiments herein have a number of advantages over known systems, devices, and methods, which will be made apparent throughout the description here. For example, the horizontal and vertical offset between side-by-side oriented terminal connectors using the ridge of the housing and the riser provides increased electrical and physical isolation, which prevents shorts, and other controller misfunctions. In addition, multiple rows (two or more) of terminal connector blocks can be oriented closely together in a small amount of space with ease of access to all rows and with little risk of wire damage, electrical shorting and/or unintended wire disconnection. Further, wires may be connected to electrical connection pads or the circuit board directly and exiting the terminal connector rows in the same direction instead of opposite or haphazard directions.

Figure 2:
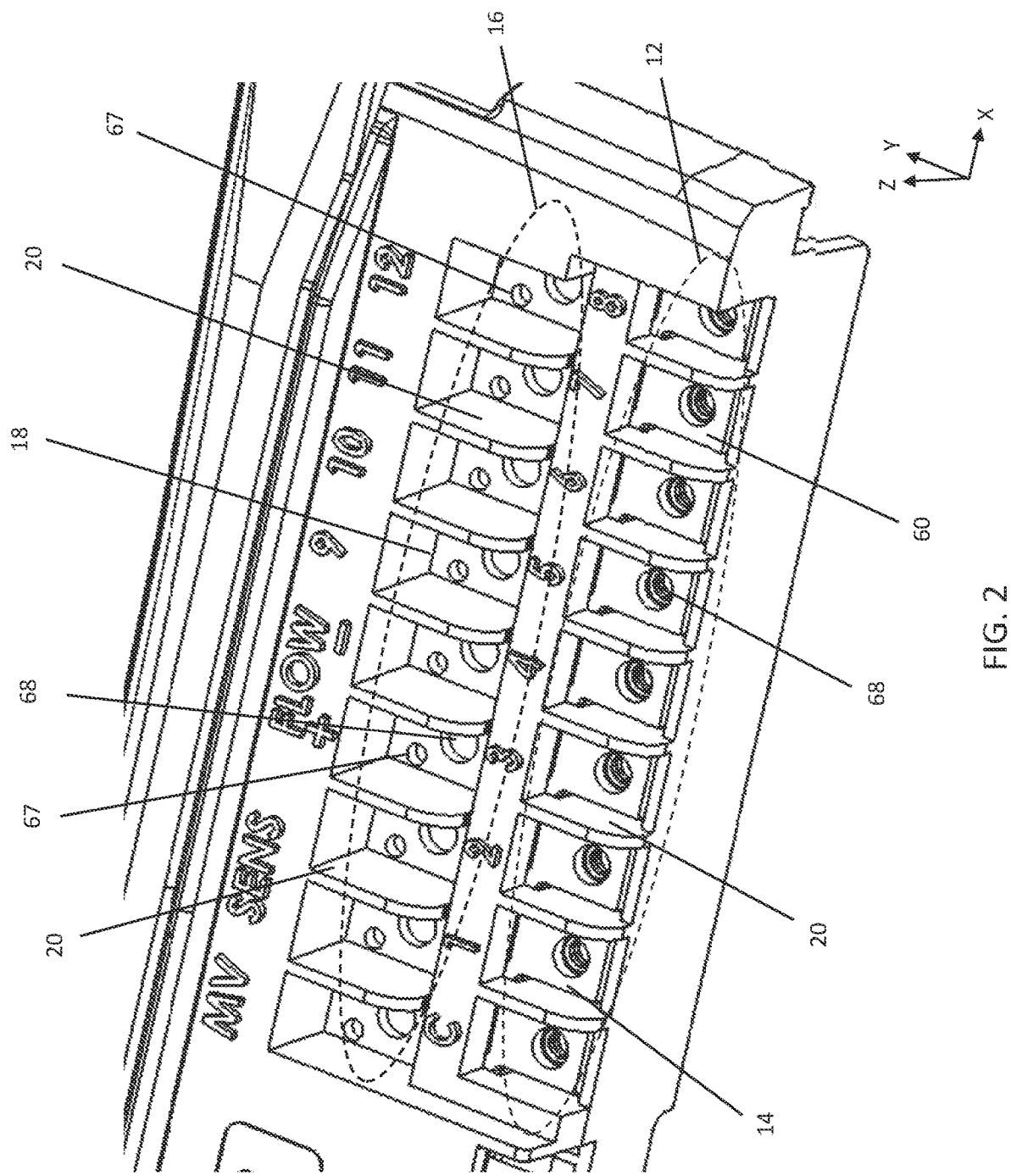
FIG. 2 is an enlarged perspective view of the terminal connector rows of FIG. 1 in accordance with some embodiments.
Figure 3:
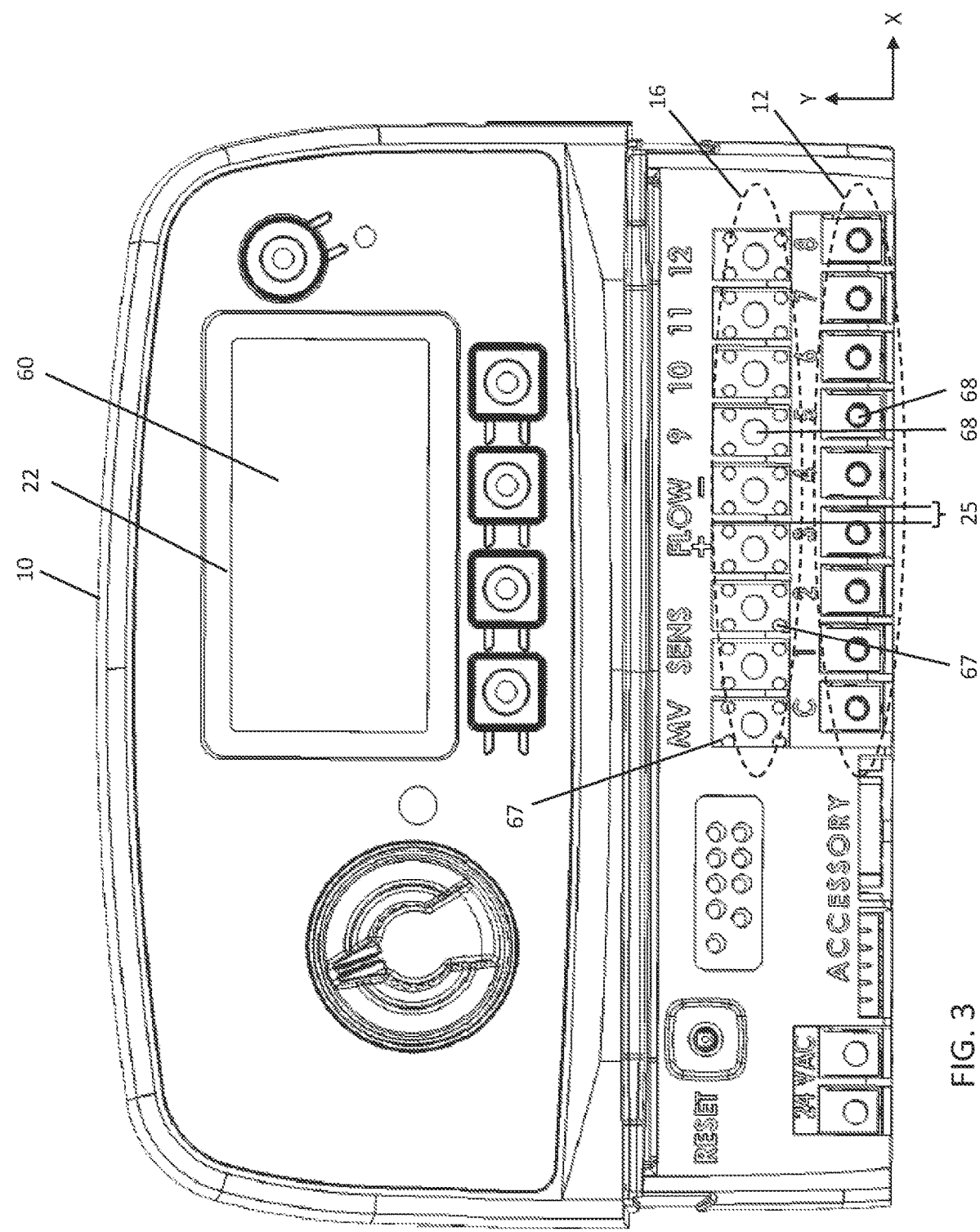
FIG. 3 is a front view of the irrigation controller of FIG. 1 in accordance with some embodiments.

FIGS. 1-3 illustrate an exemplary irrigation controller having a housing 10 with an exterior front edge 86. The housing 10 of the irrigation controller includes various openings to accommodate user interface features and electrical connectors. In some embodiments, the housing 10 includes a first row 12 of openings 14 that form a "first terminal connector row area" and a second row 16 of openings 18 that form a "second terminal connector row area". Individual openings in the housing 10 are shown as reference numbers 14 and 18. In the views of FIGS. 1-3, a circuit board 60 of the irrigation controller is viewable through the openings 14 and 18. The circuit board 60 is also viewable through a display screen opening 22 in FIGS. 1, 3, 9, and 10. As illustrated, each first row 12 and second row 16 is formed with multiple openings 14 and 18, respectively. In the illustrated embodiments, the first row 12 of openings 14 is adjacent to the second row 16 of openings 18 and in the same horizontal plane. In, addition, the first row 12 and the second row 16 are horizontally offset (in the x axis) from each other by an offset width 25.

Figure 4:
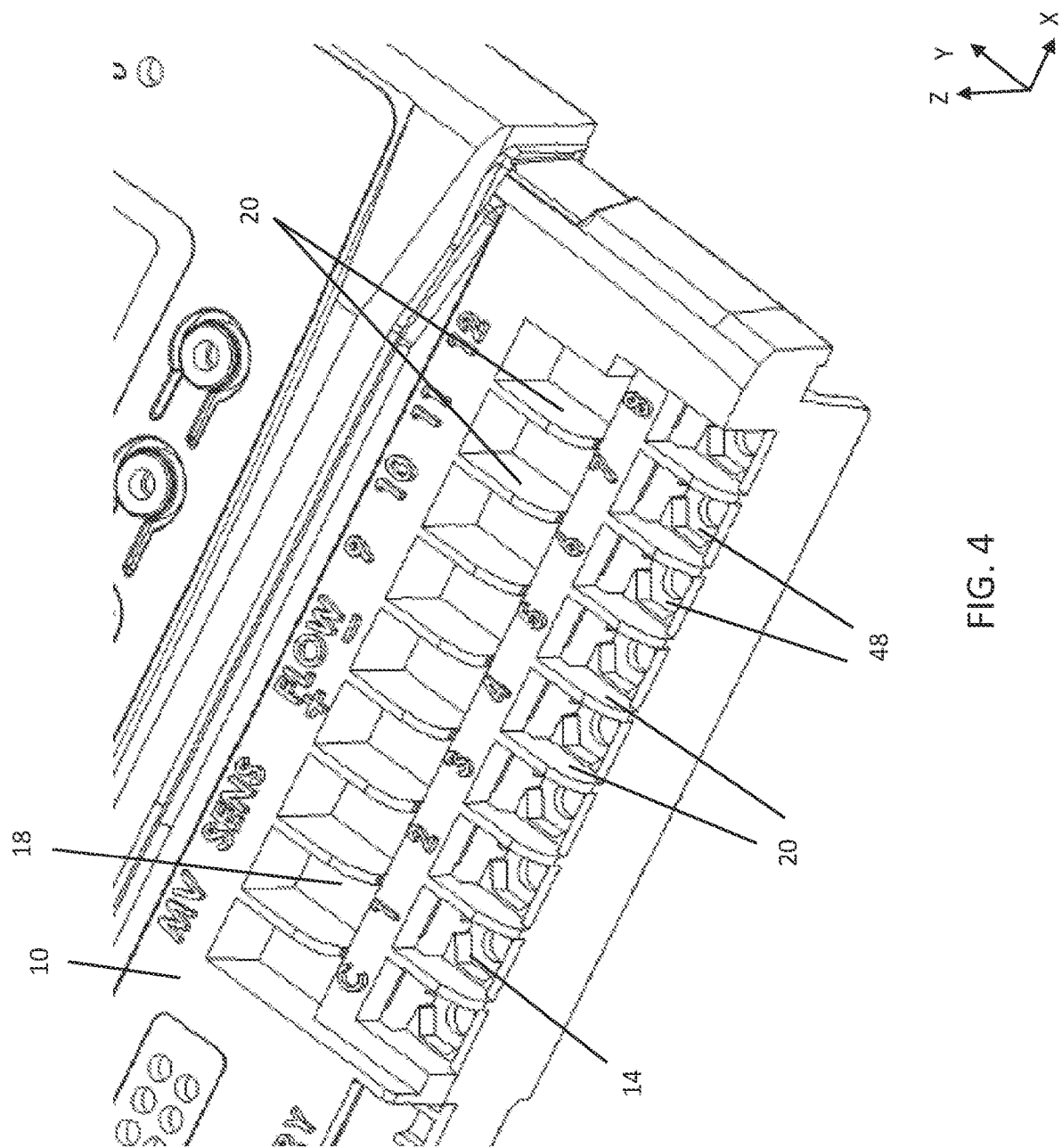
FIG. 4 is an enlarged perspective view of a portion of a housing of the irrigation controller of FIG. 1 having divider walls according to some embodiments.

FIG. 4 is an enlarged perspective view of a portion of the housing 10 of the irrigation controller of FIG. 1. In this illustration, the housing 10 is shown as uncoupled from or not including circuit board 60. The housing 10 includes divider walls 20, which vertically separates side-by side-oriented openings 14 within the first row 12 and openings 18 of the second row 16. The housing 10 includes a lower support portion having a plurality of recesses 48 formed within the first row 14 therein. The recesses 48 are configured to receive a fastening nut 29 (e.g., see nut 29 in FIGS. 7 and 11). As illustrated, holes 68 are formed in the lower support portion of the housing 10, for securing a portion of a terminal connector 70 to extend therethrough. It is understood that in some embodiments, a housing 10 may be provided such that a given terminal connector row area may not include divider walls 20 such that a terminal connector row area may be formed by one or more elongated openings in the housing 10. Accordingly, a terminal connector row area may be formed by one or more adjoined openings in the housing 10 arranged in a row.

Figure 5A:
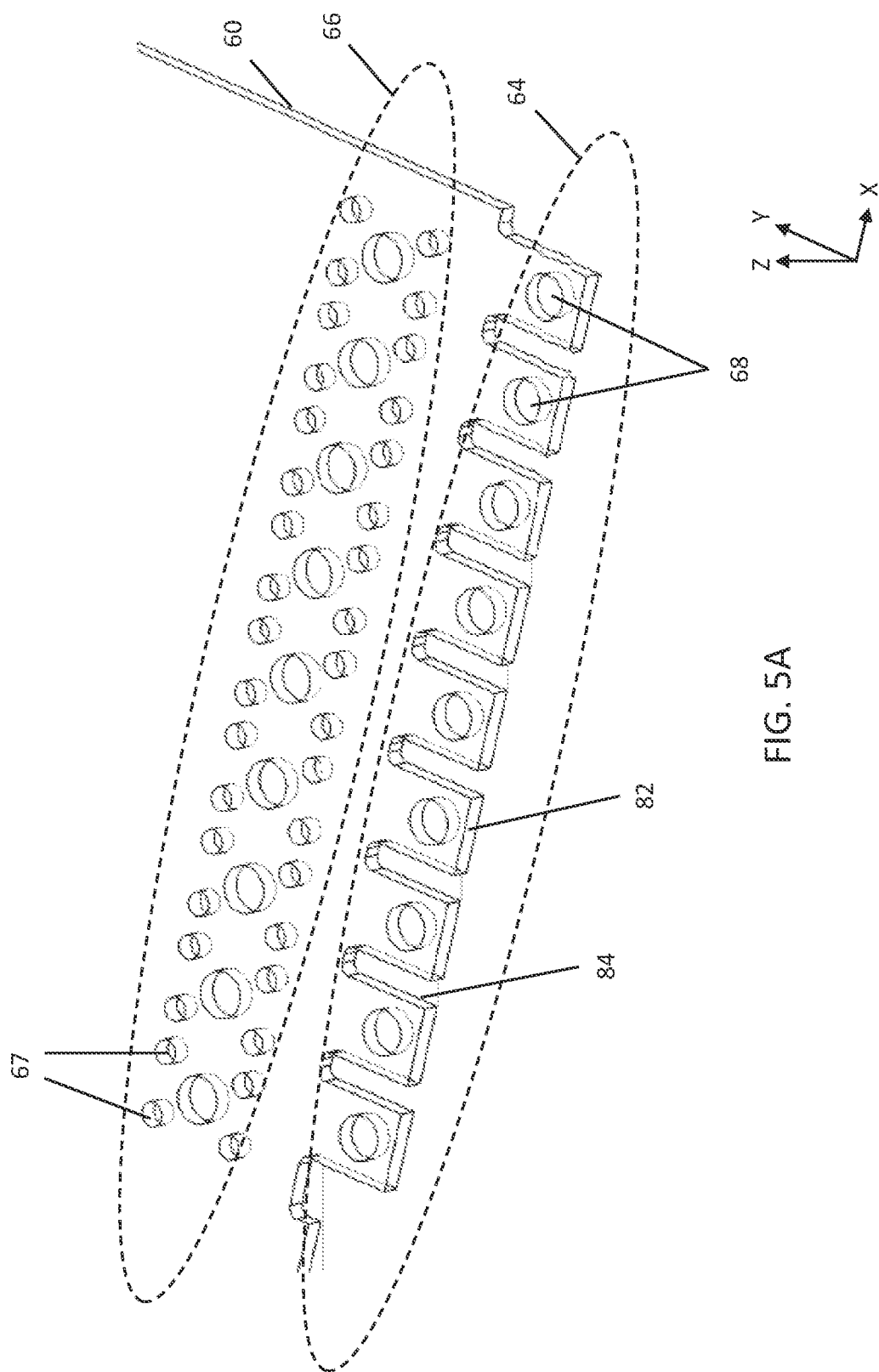
FIG. 5A is a perspective view of a circuit board with both the first and second electrical connection rows being provided without electrical connection pads, in accordance with some embodiments.
Figure 5B:
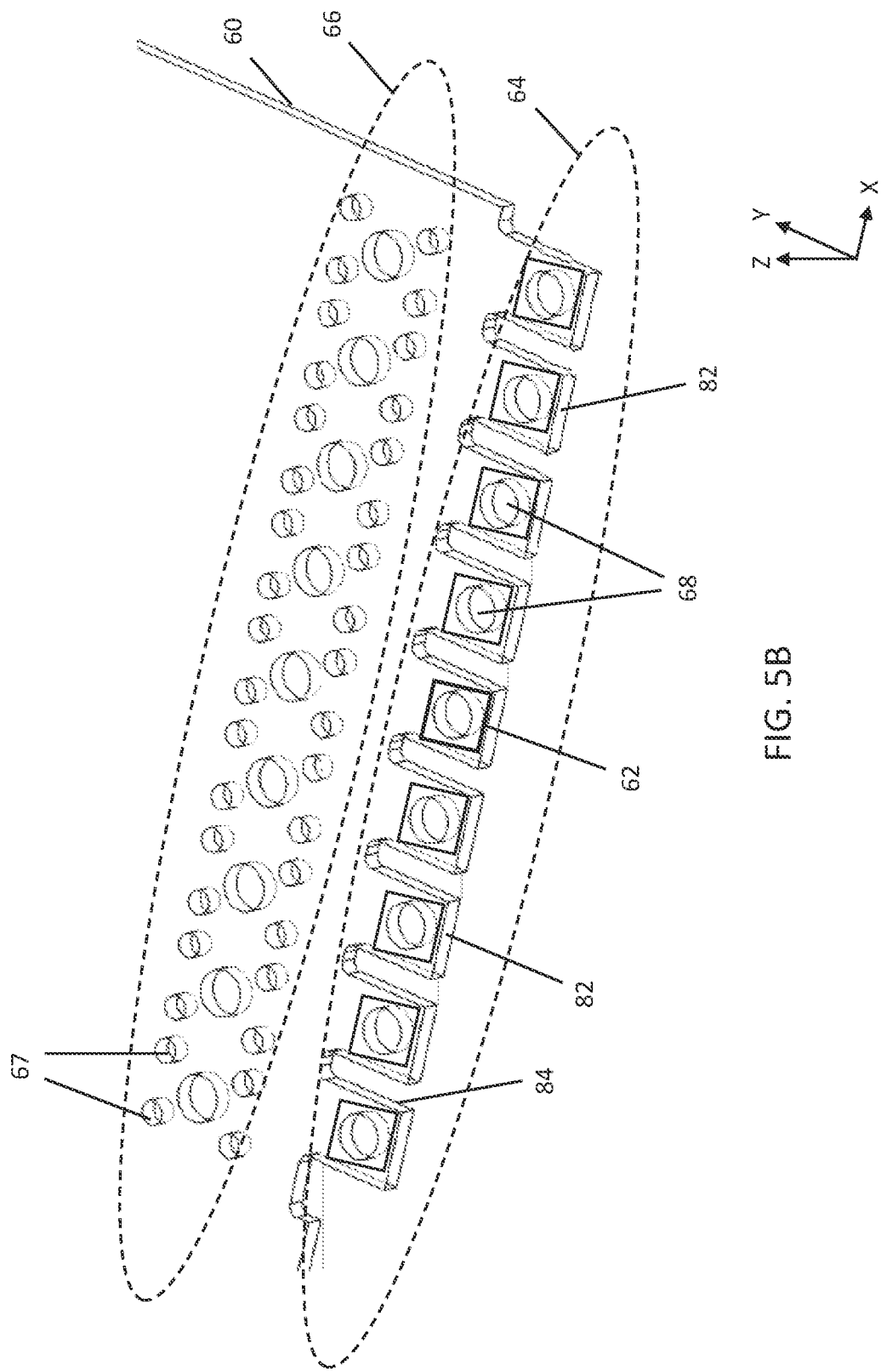
FIG. 5B is a perspective view of a circuit board with electrical connection pads provided in only the first terminal connector row, in accordance with some embodiments.

Turning to FIGS. 5A and 5B, in some embodiments, electrical connection pads 62 are provided in one or more electrical connection rows on a circuit board 60. In an embodiment, electrical connection pads 62 are provided at locations of the circuit board 60 that will be aligned with the openings 14 and 18 of the housing 10. FIG. 5A is a perspective view of a circuit board 60 with both the first and second electrical connection rows 64, 66 being provided without electrical connection pads 62, in accordance with some embodiments. FIG. 5B is a perspective view of a circuit board 60 with electrical connection pads 62 provided in only the first terminal connector row 64, in accordance with some embodiments. The electrical connection pads 62 are conductive and located on the upper surface of the circuit board 60. Electrical connection pads 62 may be embodied in a variety of ways, such as deposited, etched, placed, formed, painted, soldered etc. on the circuit board 60. In some embodiments, each electrical connection pad 62 is a thin, flat piece of conductive metal soldered to the upper surface of the circuit board 60.

The electrical connection pads 62 allow an output AC signal to be selectively switched to output terminal connectors of the controller. These electrical connection pads 62 are electrically coupled to other portions of the circuit board 60 using traces, conductors, conduits or connection pathways of the circuit board 60, for example, in an embodiment, each electrical connection pad 62 is coupled to a respective switch (not shown) under control of the main control circuit of the controller that switches a 24 volt AC signal to the electrical connection pad 62 and to any wire coupled to that electrical connection pad 62.

In the illustrated embodiments, the circuit board 60 having rows 64 and 66 further include holes 68 formed in the circuit board 60 as well as a corresponding hole 68 defined within the optional electrical connection pads 62. In some embodiments, the holes 68 are formed in the circuit board 60 before the electrical connection pads 62 are formed, attached, or deposited. In other embodiments, the holes 68 are formed after the electrical connection pads 62. In the illustrated embodiments, holes 68 are useful to secure terminal connectors 70 to the circuit board 60.

In some embodiments, the first row 64 of electrical connection pads 62 (and holes 68) are formed at a front edge 82 of the circuit board 60 (see FIG. 5B). Grooves 84 are formed in the circuit board 60 at the front edge 82 allowing divider walls 20 of the housing 10 to extend into the space provided by the grooves 84. This assists in aligning the circuit board 60 and its electrical connection pads 62 in the first row 12 of openings 14, while utilizing divider walls 20 to separate side-by-side openings 14 in the first row 12. In accordance with several embodiments, the second row 16 of openings (and second row 66 of electrical connection pads 62) are configured with a ridge portion 26 (labeled and referred to in more detail in FIGS. 8, 9 and 11) to create an offset in elevation (about the z axis) and an offset in the horizontal plane (about the x axis) between wires connected to and exiting the two rows.

Both the first electrical connection row 64 and the second electrical connection row 66 are located in a first horizontal plane at an upper exterior surface of the circuit board 60. The first electrical connection row 64 and the second electrical connection row 66 are arranged on the circuit board 60 such that when installed in the housing 10, the electrical connection pads 62 of the first electrical connection row 64 are aligned with and accessible via the first row 12 of openings 14, and such that the second electrical connection row 66 is aligned with and accessible via the second row 16 of openings 18 (e.g., see the views of FIGS. 1-3).

Figure 6B:
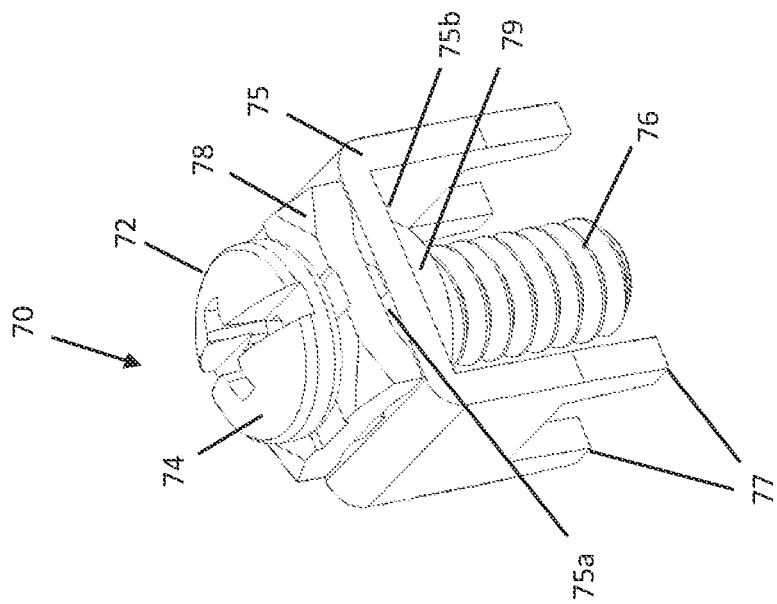
FIG. 6B is a perspective view of the terminal connector and riser of FIG. 6A.
Figure 6A:
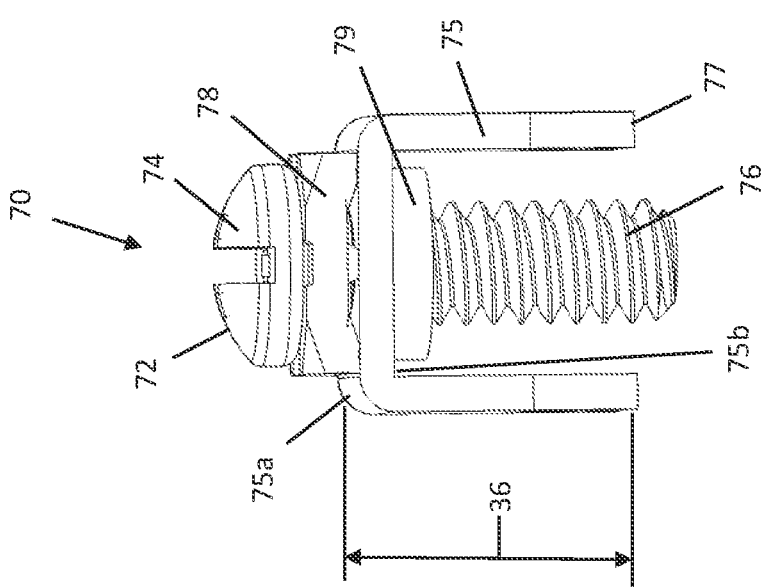
FIG. 6A is a simplified illustration of a side view of a screw-type terminal connector coupled to a riser in accordance with some embodiments.

FIGS. 6A and 6B illustrate a terminal connector 70 (e.g., screw connector) and a riser 75 according to some embodiments. Terminal connector 70 includes a screw 72, having a screw head 74, a locking plate 78, a threaded post 76, and an optional fastening portion 79. The fastening portion 79 may be provided and formed integrally with the riser 75. The post 76 passes through a locking plate 78 (e.g., a shaped washer), which may be secured to a riser 75 (e.g., vertical lift, mount, or standoff) having a riser height 36. The riser 75 has an upper surface 75a and an opposing lower surface 75b. The post 76 may also pass through the optional fastening portion 79, such that it engages the opposing lower surface 75b of the upper portion of the riser 75 for providing an additional mechanical coupling of the riser 75 to the terminal connector 70. In an embodiment, the fastening portion 79 is also threaded on an inner surface so as to mechanically engage the threaded post 76 of the terminal connector 70, further securing the terminal connector 70 to the riser 75.

Figure 7:
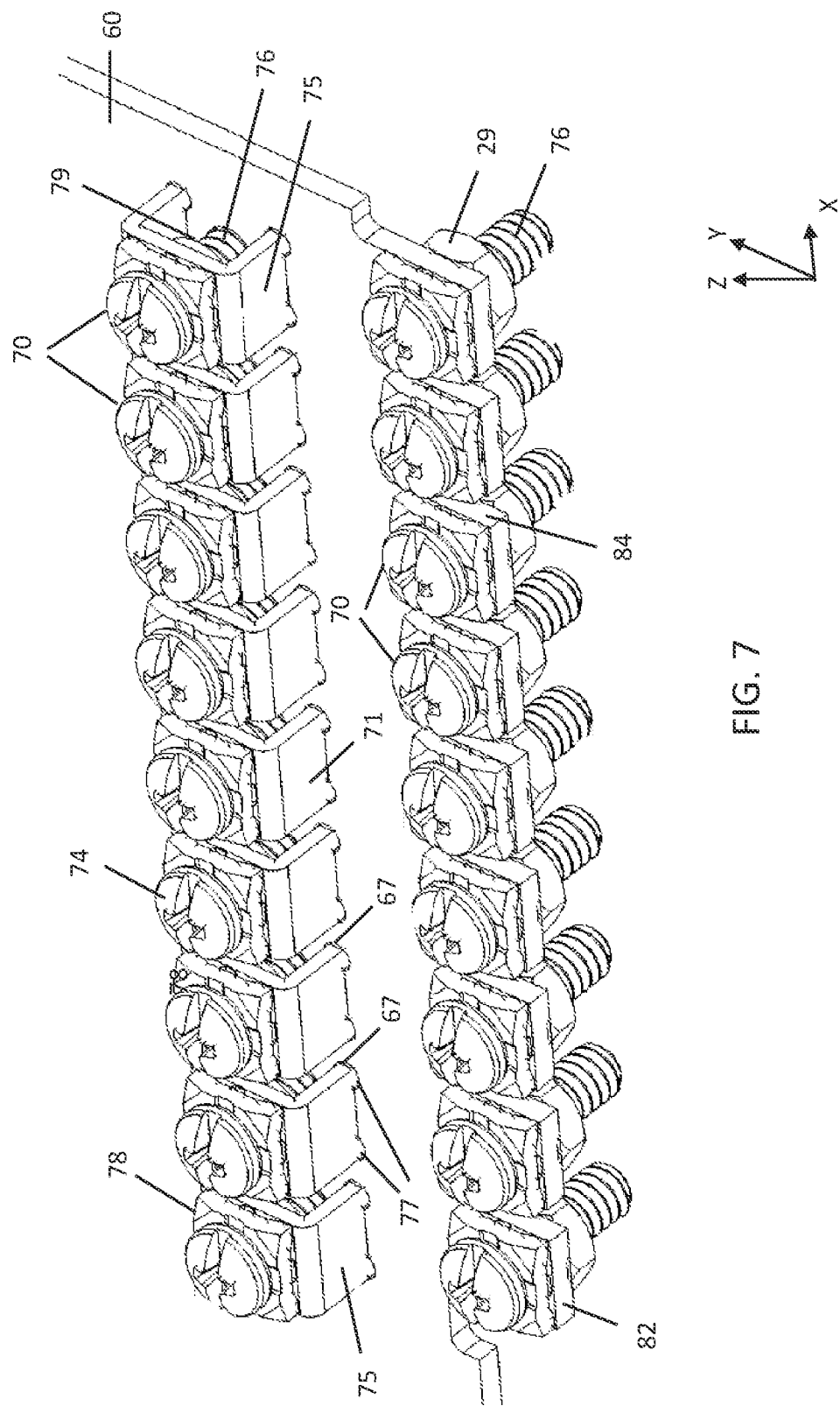
FIG. 7 is a perspective view of the circuit board of FIG. 5 having terminal connectors fastened to the terminal connector rows in accordance with some embodiments.

The riser 75 may be coupled to the circuit board 60 both mechanically and electrically. The riser 75 may include a plurality of feet 77 at a base of the riser 75. The feet 77 are configured to extend through and mate with an upper surface of the circuit board 60 at a plurality of holes 67 or openings that extend through the circuit board 60. The feet 77 (or other portion at the base 71 of the riser 75 designated for electrical and/or physical adjacent contact with the circuit board 60) may also mechanically engage the circuit board 60. As shown in FIG. 7, the feet 77 of the riser 75 may have a circular or rectangular shape that engages the holes 67 in the circuit board 60. The holes 67 may also be circular or rectangular in shape. When the feet 77 are pressed into the plurality of holes 67 within the circuit board 60, the feet 77 engage the circuit board 60 in a snug, mechanical or friction fit within the holes 67. This mechanical mating assists with securing the risers 75 to the circuit board 60 without them falling out during the assembly process. For example, the electrical connections can be formed by accessing the lower side of the circuit board 60 at the connection points by soldering or other known methods. In this manner, the feet 77 are both electrically and mechanically coupled to the circuit board 60. In the illustrated embodiments of FIGS. 6A and 6B, the riser 75 forms a substantially U shaped structure (e.g., an upside down U shape from the side as shown best in FIG. 6A) having two vertically extending side or leg portions and a top portion (having upper surface 75a and lower surface 75b, and where the legs have feet 77.

FIG. 7 further illustrates the first and second rows 64, 66 having terminal connectors 70 fastened to the circuit board 60 in accordance with some embodiments. In the first row 64, terminal connectors 70 are connected directly to the circuit board 60, or at an electrical connection pad 62 on the circuit board 60. In the second row 66, risers 75 are secured to the board 60 at holes 67, and the terminal connectors 70 are coupled to the risers 75. While electrical connection pads 62 are not illustrated herein as being present in the second electrical connection row 66, one of ordinary skill in the art would understand that risers 75 may also be coupled to electrical connection pads 62 in the second row 66 in a similar fashion as the first row 64. In the illustrated embodiment, FIG. 7 shows the fastening nuts 29 used in the first row 64 to assist in securing the connectors 70, and shows the fastening portions 79 used in the second row 66 to assist in securing the connectors 70.

Turning to FIGS. 8-11, and as variously illustrated, the housing 10 includes a ridge portion 26 (in some embodiments, also referred to as a ridge, and a row divider, for example) formed between the first row 12 and the second row 16.

The ridge portion 26 includes a first ridge wall 28 extending substantially vertically from a first base 30 of the first row 12 of openings 14 of the ridge portion 26. The ridge portion 26 further includes a second ridge wall 34 extending horizontally and parallel to the circuit board 60. The second ridge wall 34 has an upper surface 34a with a width 31. It is noted that despite the presence in some embodiments of divider walls 20 in first and second rows 12/16 of openings 14/18, generically, the first ridge wall 28 and the second ridge wall 34 are understood to encompass one continuous wall extending across the length (about the x axis) of the respective rows or a wall that is broken up or segmented into sections by divider walls 20.

Figure 8:
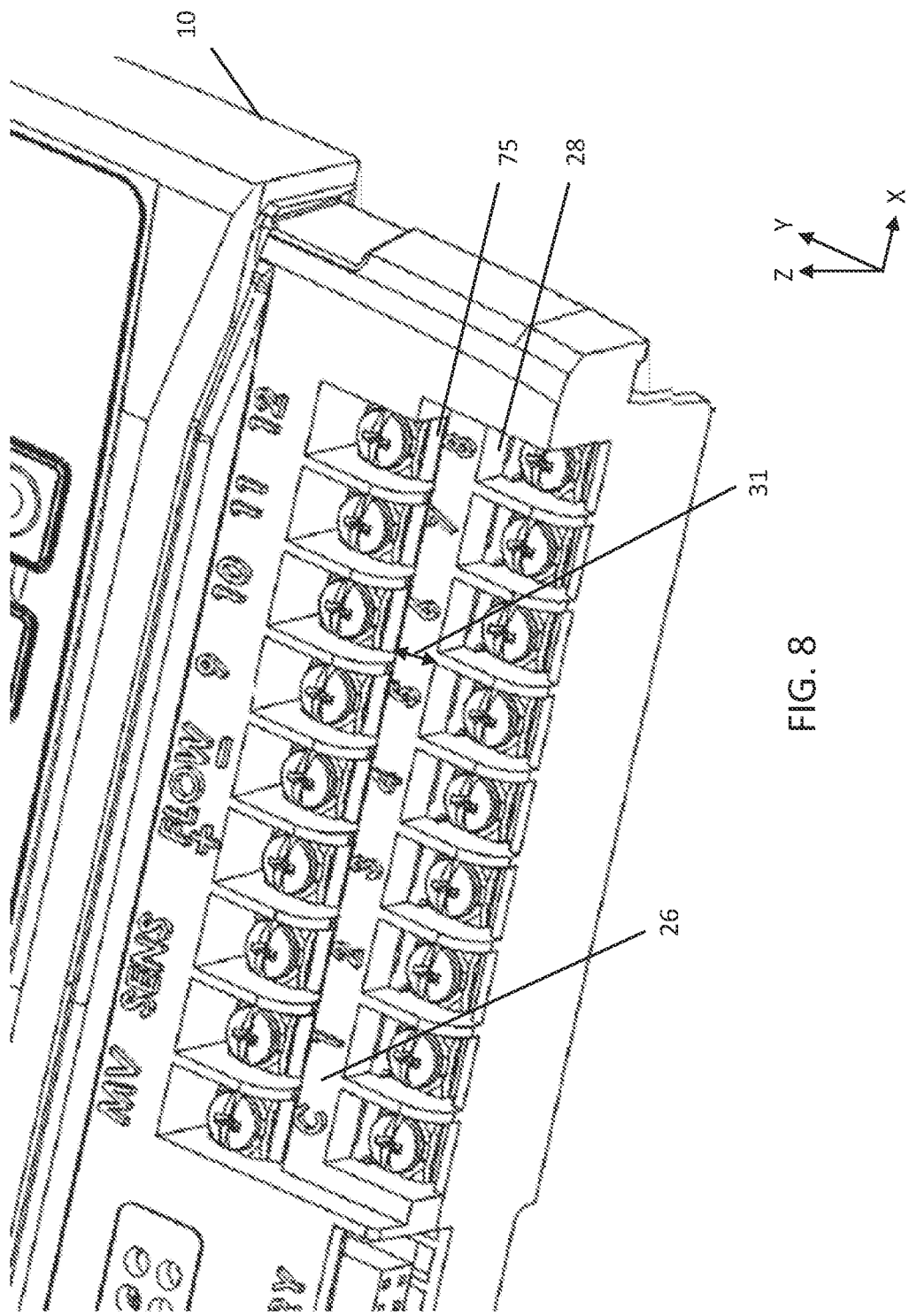
FIG. 8 is an enlarged perspective view of the irrigation controller of FIG. 1 with terminal connectors fastened to the terminal connector rows.
Figure 9:
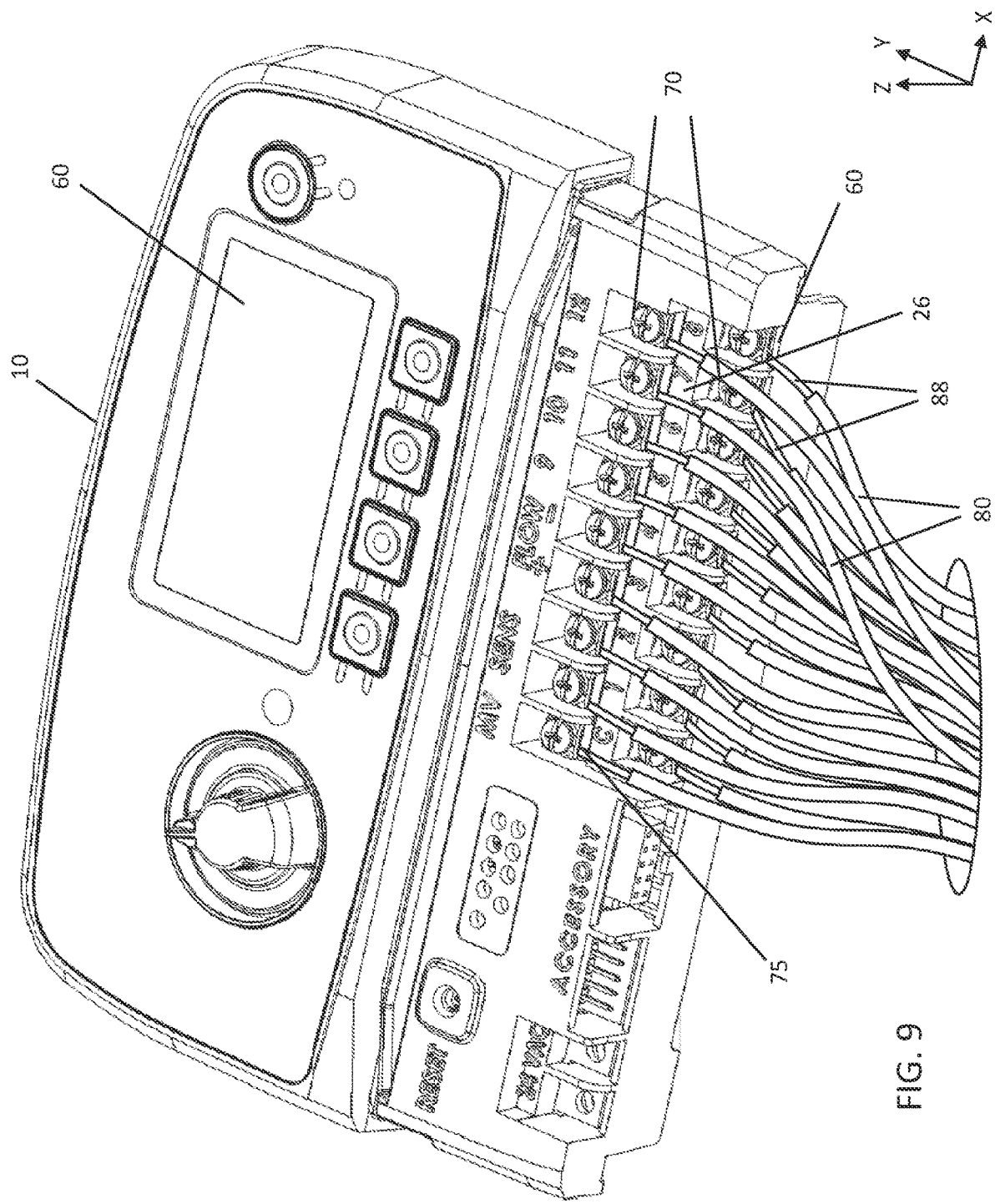
FIG. 9 is a perspective view of the irrigation controller of FIG. 1 with the terminal connectors fastened to the terminal connector rows as shown in FIG. 8 and further including wires retained by the terminal connectors in accordance with some embodiments.

FIG. 8 is an enlarged perspective view of the irrigation controller of FIG. 1 with terminal connectors fastened to the terminal connector rows. FIG. 9 is a perspective view of the irrigation controller of FIG. 1 with the terminal connectors fastened to the terminal connector rows as shown in FIG. 8 and further including wires 80 retained by the terminal connectors 70 in accordance with some embodiments. In the first terminal connector row 12, terminal connectors 70 receive a conductive exposed end 88 of a wire 80 and retaining the wire 80 by its conductive exposed end 88 against the respective optional electrical connection pads 62, and in some embodiments against the circuit board 60 directly. Specifically, the post 76 of the terminal connector 70 passes through a locking plate 78 (e.g., washer) and the hole 68 at the electrical connection pad 62, and tightens into a fastening nut 29 (e.g., a hexagonally shaped nut) on the underside of the circuit board 60. The exposed end 88 is retained between the locking plate 80 and the electrical connection pad 62 or circuit board 60.

The terminal connectors 70 in the second terminal connector row 16 receive the conductive exposed end of a wire 80 and retain the wire 80 by its conductive exposed end against respective risers 75 which are coupled to the circuit board 60 directly. As illustrated, the exposed ends 88 of wires 80 in the second row 16 are positioned under the locking plate 78, and the screw head 74 is tightened such that the exposed ends 88 are held tightly against the upper surface 75a of the riser 75. An optional fastening portion 79, which may be integrally formed with the riser 75, may be provided to further secure the post 76 to the riser 75. A clockwise tightening action of the screw head 74 helps ensure that the exposed portion 88 of the wire 80 are held tightly against the electrical connection pad 62, circuit board 60, or riser 75.

As further illustrated in FIG. 9, in some embodiments, the second ridge wall 34 is configured to support and guide wires 80 to the second row 66 of electrical connection pads 62 to be retained thereagainst. Generally, the structure of the ridge portion 26 and the second ridge wall 34 is configured to support the wires 80 retained in the second row 66 of electrical connection pads 62 above the wires 80 retained in the first row 64 of electrical connection pads 62. In this way, the wires 80 connected to the second row 66 of pads 62 (in the second row 16 of openings 18) will rest above the wires 80 of the first row 64 of pads 62 (in the first row 12 of openings 14). Thus, there will be no risk of exposed portions of the wires 80 connected to the second row 66 from contacting conductive portions of other wires 80 connected to the first row 64. It should be observed that the divider walls 20 of the first row 12 and the second row 16 provide a separation barrier between side-by-side oriented electrical connection pads 62 of the first row 64 and/or second row 66 of electrical connection pads 62 to reduce wires 80 in side-by-side openings from contacting each other. It is noted that the width 31 (y axis dimension in the FIGS.) of the second ridge wall 34 will in part define the spatial distance or offset in the y-axis between the first and second row of retained wires 80.

In some embodiments, the x axis offset between wires 80 in the horizontal plane can be further enhanced by connecting the exposed portions 88 of the wires 80 connected to the terminal connectors 70 of the first row 64, by positioning the exposed portions 88 underneath opposing edges (right in one row and left in another) of the locking plate 78 of the terminal connectors 70 between rows.

Figure 10:
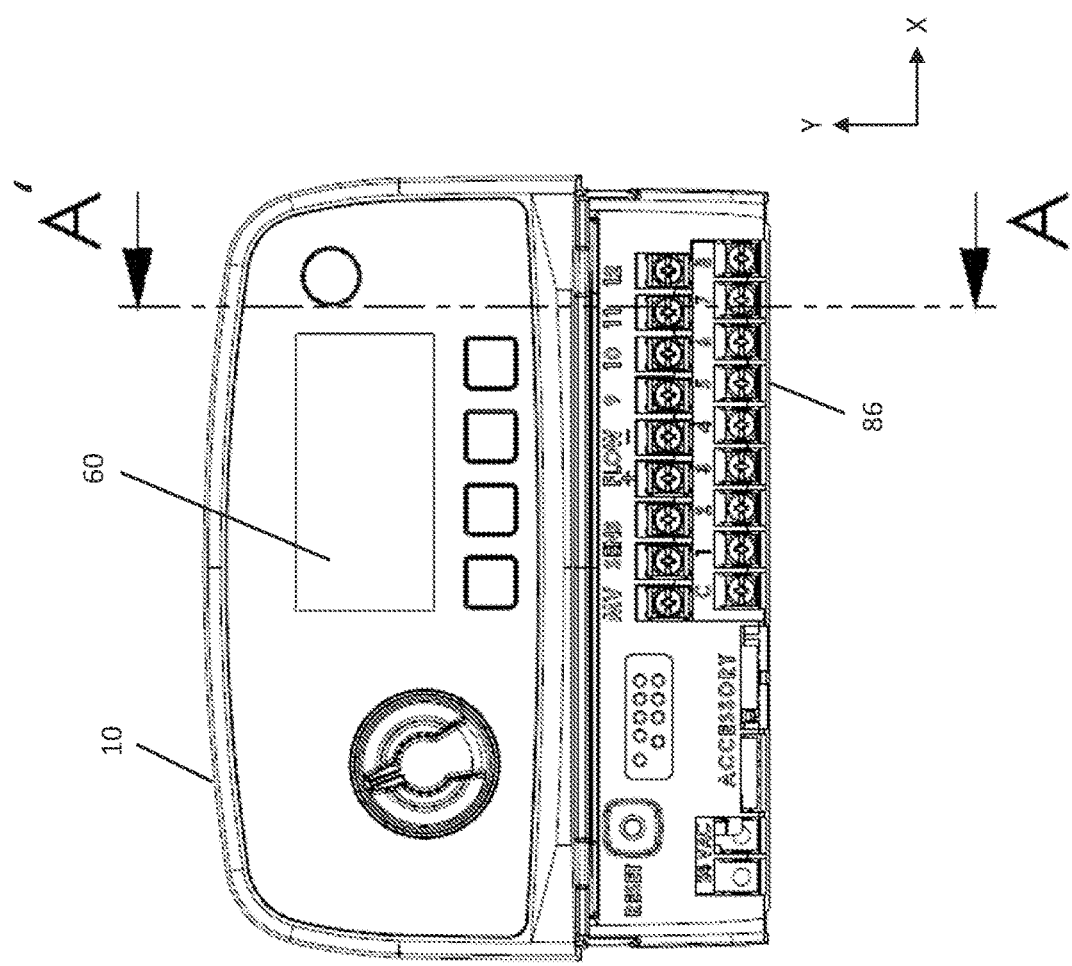
FIG. 10 is a front view of the irrigation controller of FIG. 1 with the terminal connectors fastened to the terminal connector rows as shown in FIG. 8 and further showing a location of plane A-A'.
Figure 11:
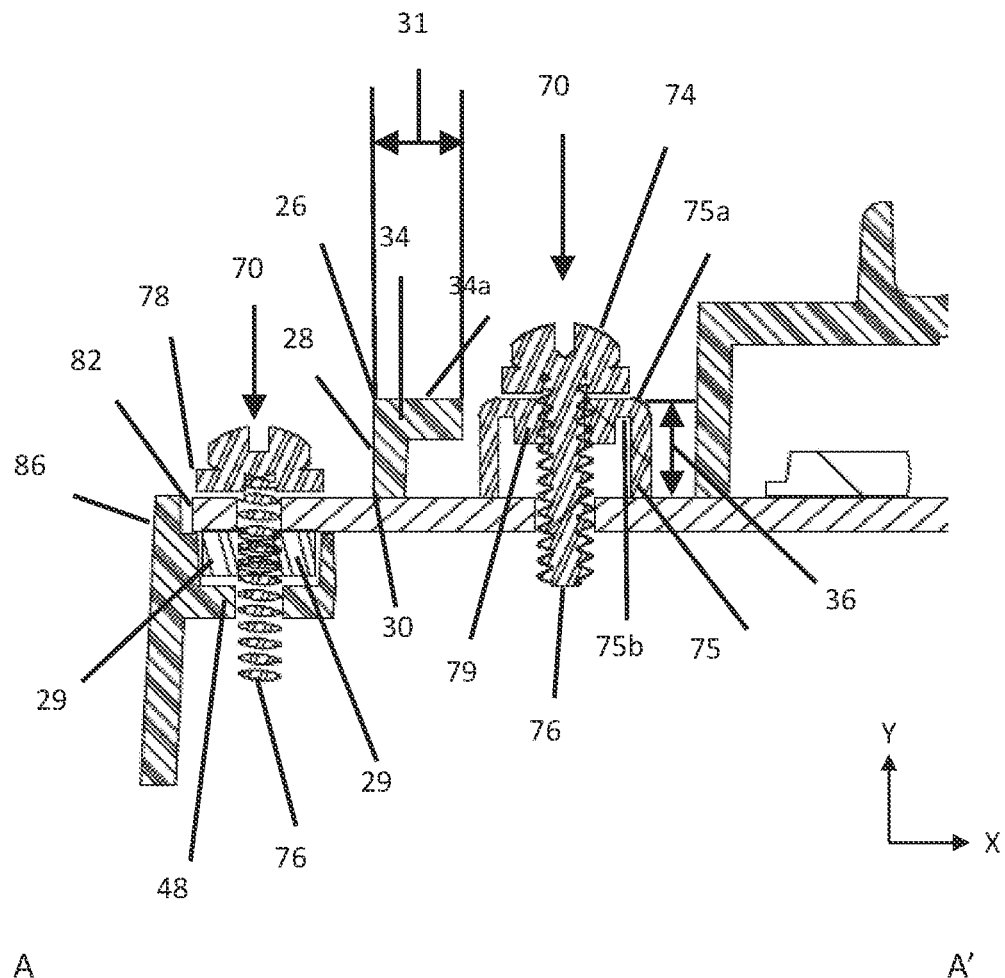
FIG. 11 is cross sectional view across plane A-A' of the irrigation controller of FIG. 10.

FIG. 11 is a cross section of the controller of FIG. 10 across vertical plane A-A. The second ridge wall 34 may also be aligned with, substantially horizontal to, or approximately on a same plane as the upper surface 75a of the riser 75. It is understood that the parallel alignment of the riser 75 relative to the second ridge wall 34 is approximate and will be in part a function of how securely the housing 10 is attached or secured to the circuit board 60. In the illustrated embodiments, the ridge portion 26 is formed by the housing 10. However, in other embodiments, the ridge portion may be separate from the housing. For example, the ridge portion may be implemented in a separate housing or as separate component fixed to the circuit board 60 or to another support structure that would locate the ridge portion in between the first rows 12 and 64 and the second rows 16 and 66.

In some embodiments, given that the first row 12 and the second row 16 of openings (and the first row 64 and the second row 66 of the electrical connection pads 62) are offset from each other in the x axis (see offset width 25 in FIG. 3), the wires 80 extending from the second row exiting the openings of the second row 16 are offset in the x axis from the wires 80 extending from the first row exiting the openings of the first row 12. As can be seen in FIG. 9, the wires 80 from the second row are spatially separated (in the x axis) from the other wires so that an installer can more easily access the terminal connectors 70 of the wires 80 of the first row 64. This helps to avoid damage or unintended disconnections from physically moving wires (by hand or tool) extending from the second rows to expose the wires of the first row. For example, an installer may use the blade of a screwdriver to move or spread the wires from the second row and could unintentionally cut the protective insulator of the wires when moving them or cause them to disconnect from their respective electrical connection pads.

As can be seen, in some embodiments, the structure to provide the vertical offset in the second connector terminal row 16 relative to the first terminal connector row 12 can be implemented with minimal components. For example, the risers of FIGS. 6A and 6B are not required to be individually or collectively packaged within an integrated insulating structure surrounding the sides of the risers. That is, in some embodiments, there is no insulating material packaged around a given riser. Instead of such separating insulating material, the risers 75 are spaced on the circuit board such that there is a spacing (along the x axis) to ensure that adjacent risers 75 and/or wires 80 extending therefrom do not contact each other. And further, rather than an insulating structure formed about/around the risers 75, the molding of the housing 10 (including the openings 14 and 18 with divider walls 20) provide any insulating barrier between adjacent risers 75. In other words, through the design of the housing 10 to include insulating barriers and circuit board spacing, the risers 75 do not need any separate insulating walls or structure.

It is understood that in some embodiments, the housing 10 is a housing for a traditional stand-alone irrigation controller that includes a user interface and programming for users to define and program watering and output control signaling to connected irrigation valves. In other embodiments, the housing 10 may be implemented in an irrigation controller that lacks a user interface and/or for which some or all of the watering programming is done at a remote device in communication with the irrigation controller. For example, a remote computer, server, mobile device, smart phone, other irrigation controller, etc. may be used to generate the programming for the controller. As such, generically, in some embodiments, the term "irrigation control unit" or "irrigation control device" is used to at least encompass all such irrigation controllers. It is further understood that the electrical components that may be coupled or attached to the circuit board 60 described herein depend on the specific implementation of the control device and are understood in the art. It is further understood that the controller may include more than one circuit board, such as one circuit containing the main control circuitry and another circuit board containing the output electrical connectors or other backplane electrical connectors.

Various systems, devices and methods are provided herein. In some embodiments, an irrigation control device comprises: a housing comprising: a first row of one or more openings forming a first terminal connector row; and a second row of one or more openings forming a second terminal connector row, the second row located adjacent and proximate to the first row; a circuit board for securing a first plurality of terminal connectors in the first terminal connector row and a second plurality of terminal connectors in the second terminal connector row, wherein each of the first and second plurality of terminal connectors is configured to receive a conductive exposed end of a wire and retain the wire at the conductive exposed end. The housing further comprises: a ridge portion located between the first and second terminal connector rows, the ridge portion comprising: a first ridge wall extending substantially vertically from a first base of the first terminal connector row; and a second ridge wall, integrated with the first ridge wall, extending substantially horizontally from a base of the first terminal connector row; wherein the ridge portion is configured to support and guide the wires retained by the second plurality of terminal connectors above the wires retained by the first plurality of terminal connectors; and a plurality of risers each having an upper portion, the upper portion being positioned adjacent to the ridge portion, wherein the plurality of risers is configured to electrically and mechanically connect the second plurality of terminal connectors to the circuit board at a plurality of discrete connection points.

In some embodiments, the upper portion of each of the plurality of risers is substantially on a same horizontal plane as an upper surface of the second ridge wall. In some embodiments, at least one of the first terminal connector row and the second terminal connector row further comprises a plurality of electrical connection pads coupled to the circuit board. In some embodiments, the first and second plurality of terminal connectors each comprise: a screw, having a head and a post; and a locking plate positioned adjacent to the head, wherein the post extends through the locking plate. In some embodiments, each of the plurality of first terminal connectors is configured to retain the conductive exposed end of the wire between the locking plate and the respective one of the electrical connection pads of the first terminal connector row.

In some embodiments, each of the second plurality of terminal connectors further comprises: a fastening portion for securing the screw to a respective riser of the plurality of risers. In some embodiments, the conductive exposed end of the wire is held between and against the locking plate and an upper surface of the upper portion of the respective riser. In some embodiments, the plurality of risers vertically offsets the second plurality of terminal connectors relative to the first plurality of terminal connectors. In some embodiments, the irrigation control device further comprises a plurality of holes formed in the circuit board corresponding to a location of the plurality of discrete connection points. In some embodiments, each of the plurality of risers is soldered to the circuit board at a location of the plurality of discrete connection points. In some embodiments, the housing further comprises divider walls extending from the ridge portion, the divider walls configured to provide a separation barrier between side-by-side oriented terminal connectors within the first plurality of terminal connectors and between side-by-side oriented terminal connectors and risers within the second plurality of terminal connectors. In some embodiments, a cross sectional shape of at least one of the plurality of risers is substantially U-shaped.

In some embodiments, an irrigation control device comprises: a circuit board; a housing for retaining the circuit board, the housing comprising: a first terminal connector row and a second terminal connector row adjacent to the first terminal connector row; a first and second plurality of terminal connectors located within the first and second terminal connector rows respectively, each of the first and second plurality of terminal connectors configured to receive a conductive exposed end of a wire and retain the wire at the conductive exposed end; and a plurality of risers coupled to the second plurality of terminal connectors, the plurality of risers configured to provide a vertical offset between the second plurality of terminal connectors and the first plurality of terminal connectors, wherein each of the plurality of risers is secured directly to the circuit board. In some embodiments, the irrigation control device further comprises: a ridge portion formed by the housing and located between the first and second terminal connector rows, the ridge portion comprising: a first ridge wall extending substantially vertically from a base of the first terminal connector row; and a second ridge wall, integrated with the first ridge wall, extending substantially horizontally from the base of the first terminal connector row, wherein the second ridge wall is configured to support and guide the wires retained by the second plurality of terminal connectors above the wires retained by the first plurality of terminal connectors.

In some embodiments, the housing further comprises divider walls, located in the first and second terminal connector rows, the divider walls configured to provide a separation barrier between side-by-side oriented terminal connectors within the first plurality of terminal connectors and between side-by-side oriented terminal connectors and risers within the second plurality of terminal connectors. In some embodiments, the first terminal connector row is horizontally offset in the first horizontal plane from the second terminal connector row such that the wires exiting the second terminal connector row are horizontally offset from the wires exiting the first terminal connector row. In some embodiments, the plurality of risers is soldered to the circuit board at a plurality of discrete connection points. In some embodiments, the first and second plurality of terminal connectors each comprises: a screw, having a head and a post; and a locking plate adjacent to the head, the post extending through the locking plate. In some embodiments, each of the second plurality of terminal connectors further comprises: a fastening portion for securing the screw to a respective riser of the plurality of risers, the fastening portion being integrally formed with the riser and positioned about the post. In some embodiments, an exposed portion of the wire is held between and against the locking plate and an upper surface of the upper portion of the respective riser.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An irrigation control device comprising:
   a housing comprising:
      a first row of one or more openings forming a first terminal connector row; and
      a second row of one or more openings forming a second terminal connector row, the second row located adjacent and proximate to the first row;
   a circuit board for securing a first plurality of terminal connectors in the first terminal connector row and a second plurality of terminal connectors in the second terminal connector row,
   wherein each of the first and second plurality of terminal connectors is configured to receive a conductive exposed end of a wire and retain the wire at the conductive exposed end; and
   wherein the housing further comprises:
      a ridge portion located between the first and second terminal connector rows, the ridge portion comprising:
         a first ridge wall extending substantially vertically from a first base of the first terminal connector row; and
         a second ridge wall, integrated with the first ridge wall, extending substantially horizontally from a base of the first terminal connector row;
         wherein the ridge portion is configured to support and guide the wires retained by the second plurality of terminal connectors above the wires retained by the first plurality of terminal connectors; and
      a plurality of risers each having an upper portion, the upper portion being positioned adjacent to the ridge portion,
      wherein the plurality of risers is configured to electrically and mechanically connect the second plurality of terminal connectors to the circuit board at a plurality of discrete connection points.

2. The irrigation control device of claim 1, wherein the upper portion of each of the plurality of risers is substantially on a same horizontal plane as an upper surface of the second ridge wall.

3. The irrigation control device of claim 1, wherein at least one of the first terminal connector row and the second terminal connector row further comprises a plurality of electrical connection pads coupled to the circuit board.

4. The irrigation control device 3, wherein the first and second plurality of terminal connectors each comprise:
a screw, having a head and a post; and
a locking plate positioned adjacent to the head, wherein the post extends through the locking plate.

5. The irrigation control device of claim 4, wherein each of the plurality of first terminal connectors is configured to retain the conductive exposed end of the wire between the locking plate and the respective one of the electrical connection pads of the first terminal connector row.

6. The irrigation control device of claim 4, wherein each of the plurality of risers further comprises:
a fastening portion for securing the screw to a respective riser of the plurality of risers, the fastening portion being integrally formed with the riser and positioned about the post.

7. The irrigation control device of claim 4, wherein the conductive exposed end of the wire is held between and against the locking plate and an upper surface of the upper portion of the respective riser.

8. The irrigation control device of claim 1, wherein the plurality of risers vertically offset the second plurality of terminal connectors relative to the first plurality of terminal connectors.

9. The irrigation control device of claim 1, further comprising a plurality of holes formed in the circuit board corresponding to a location of the plurality of discrete connection points.

10. The irrigation control device of claim 1, wherein each of the plurality of risers is soldered to the circuit board at a location of the plurality of discrete connection points.

11. The irrigation control device of claim 1, wherein the housing further comprises divider walls extending from the ridge portion, the divider walls configured to provide a separation barrier between side-by-side oriented terminal connectors within the first plurality of terminal connectors and between side-by-side oriented terminal connectors and risers within the second plurality of terminal connectors.

12. The irrigation control device of claim 1, wherein a cross sectional shape of at least one of the plurality of risers is substantially U-shaped.

13. An irrigation control device comprising:
a circuit board;
a housing for retaining the circuit board, the housing comprising:
a first terminal connector row and a second terminal connector row adjacent to the first terminal connector row;
a first and second plurality of terminal connectors located within the first and second terminal connector rows respectively, each of the first and second plurality of terminal connectors configured to receive a conductive exposed end of a wire and retain the wire at the conductive exposed end; and
a plurality of risers coupled to the second plurality of terminal connectors, the plurality of risers configured to provide a vertical offset between the second plurality of terminal connectors and the first plurality of terminal connectors,
wherein each of the plurality of risers is secured directly to the circuit board.

14. The irrigation control device of claim 13, further comprising:
a ridge portion formed by the housing and located between the first and second terminal connector rows, the ridge portion comprising:
a first ridge wall extending substantially vertically from a base of the first terminal connector row; and
a second ridge wall, integrated with the first ridge wall, extending substantially horizontally from the base of the first terminal connector row,
wherein the second ridge wall is configured to support and guide the wires retained by the second plurality of terminal connectors above the wires retained by the first plurality of terminal connectors.

15. The irrigation control device of claim 13, wherein the housing further comprises divider walls, located in the first and second terminal connector rows, the divider walls configured to provide a separation barrier between side-by-side oriented terminal connectors within the first plurality of terminal connectors and between side-by-side oriented terminal connectors and risers within the second plurality of terminal connectors.

16. The irrigation control device of claim 13, wherein the first terminal connector row is horizontally offset in the first horizontal plane from the second terminal connector row such that the wires exiting the second terminal connector row are horizontally offset from the wires exiting the first terminal connector row.

17. The irrigation control device of claim 13, where in the plurality of risers is soldered to the circuit board at a plurality of discrete connection points.

18. The irrigation control device of claim 13, wherein the first and second plurality of terminal connectors each comprises:
a screw, having a head and a post; and
a locking plate adjacent to the head, the post extending through the locking plate.

19. The irrigation control device of claim 18, wherein each of the plurality of risers comprises:
a fastening portion for securing the screw to a respective riser of the plurality of risers, the fastening portion being integrally formed with the riser and positioned about the post.

20. The irrigation control device of claim 18, wherein an exposed portion of the wire is held between and against the locking plate and an upper surface of the upper portion of the respective riser.

* * * * *

UNITED STATES PATENT AND TRADEMARK OFFICE
CERTIFICATE OF CORRECTION

| | |
|---|---|
| PATENT NO. | : 11,955,759 B2 |
| APPLICATION NO. | : 17/572304 |
| DATED | : April 9, 2024 |
| INVENTOR(S) | : Nickerson et al. |

It is certified that error appears in the above-identified patent and that said Letters Patent is hereby corrected as shown below:

In the Claims

In Column 11, Claim 4, Line 1, delete "device 3," and insert --device of claim 3,--, therefor.

In Column 12, Claim 17, Line 35, delete "where in" and insert --wherein--, therefor.

Signed and Sealed this
Eighteenth Day of June, 2024

Katherine Kelly Vidal
*Director of the United States Patent and Trademark Office*